July 1, 1958 A. J. RADCLIFFE, JR 2,841,719

DIODE GATE AND ITS CONTROL CIRCUIT

Filed Jan. 26, 1955

United States Patent Office 2,841,719

Patented July 1, 1958

2,841,719

DIODE GATE AND ITS CONTROL CIRCUIT

Arthur J. Radcliffe, Jr., La Grange, Ill., assignor to International Telephone and Telegraph Corporation, New York, N. Y., a corporation of Maryland Application January 26, 1955, Serial No. 484,116

4 Claims. (Cl. 307—88.5)

Figure 1:
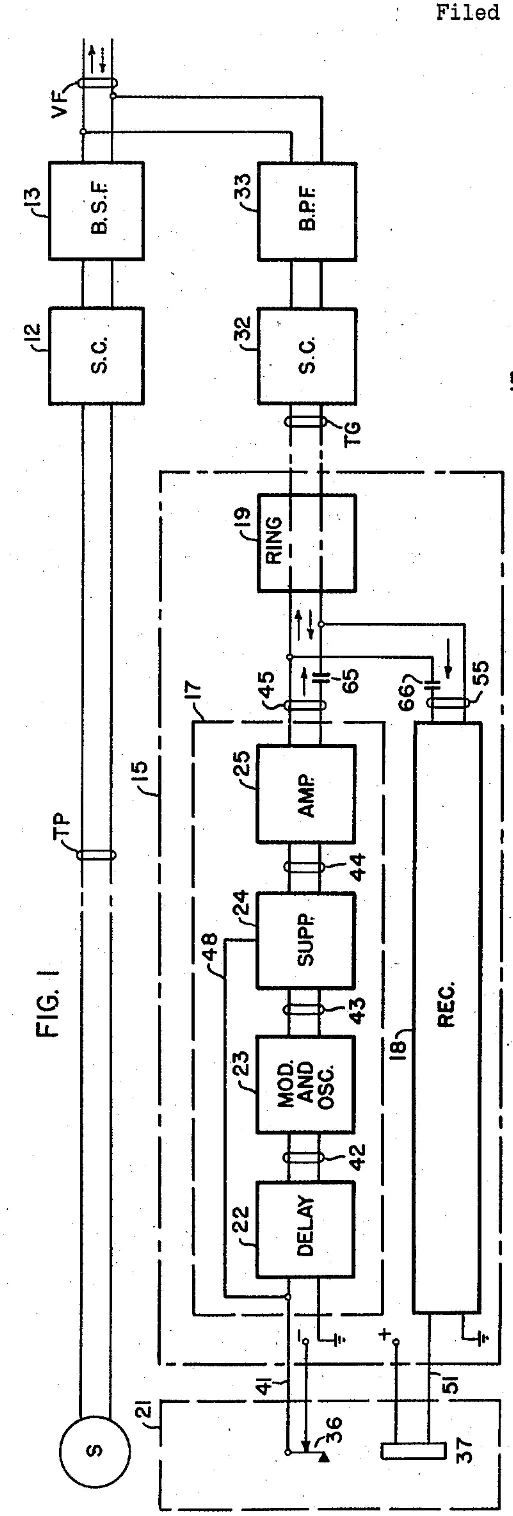

This invention relates to a diode gate and its control circuit, and more particularly to such a circuit combination used for removing the carrier from the line, and for replacing it thereon, under signal control in an A. C., or carrier, telegraph transmission system. Its principal object is to provide an economical and satisfactory arrangement of the foregoing character which is suitable for use with a transistorized telegraph-terminal coupler located between a transmitting D. C. teletypewriter line and a two-way or multi-station carrier transmission line.

In two-way or multi-station carrier telegraph systems, it is common practice to apply carrier current to the line from any station only during an active sending period thereat so as to leave the line normally free for transmission from any point thereon. That is, the carrier supplied to the line at any station is suppressed thereat except during sending; is applied promptly when sending begins; and is again suppressed when sending is interrupted for more than a predetermined interval. One example is found in the pending United States patent application of Walter A. Miner (case 4) for a Tone Suppression Circuit, Serial No. 302,066, filed July 23, 1952, now Patent No. 2,738,381. There, a control circuit includes a timing condenser which charges through a high-resistance path from the signal on the teletypewriter line when not sending, and discharges through a low-resistance path including a vacuum-tube diode when sending begins. A vacuum-tube direct current amplifier detects the charge potential of the condenser and controls a relay or a vacuum-tube gate in the carrier line.

In many situations it is desirable to use transistors and crystal diodes instead of vacuum tubes, because of advantages such as reduced space and power requirements. But a direct-current transistor amplifier is usually unsatisfactory because of output variations with temperature changes. A diode gate with bias controlled by the condenser voltage might be used, but in an unbalanced circuit a transient pulse appears in the output and saturates the carrier amplifier when the gate is triggered at the beginning of transmission, and thus blocks the output for an interval which causes the loss of part of the first signal.

According to the invention, a balanced diode gate is used in a link between the carrier source and the output amplifier. The gate bias current is supplied from a simplex circuit of the link and controlled by the charge-potential of a timing condenser. A control diode is used between the condenser and a direct-current circuit from the teletypewriter line. The condenser charges through a high resistance path in the simplex circuit and discharges through a low resistance path including the control diode.

In the preferred form, the signals on the teletypewriter line comprise a mark signal of current flow at a given potential and a space signal of no current flow, the mark signal being normally on the line. A delay device and a modulated oscillator supplying the carrier are used between the teletypewriter line and the gate, to allow time to place a carrier mark signal on the line before the first space signal when sending starts. The gate comprises a pair of series diodes and a pair of shunt diodes.

Figure 2:
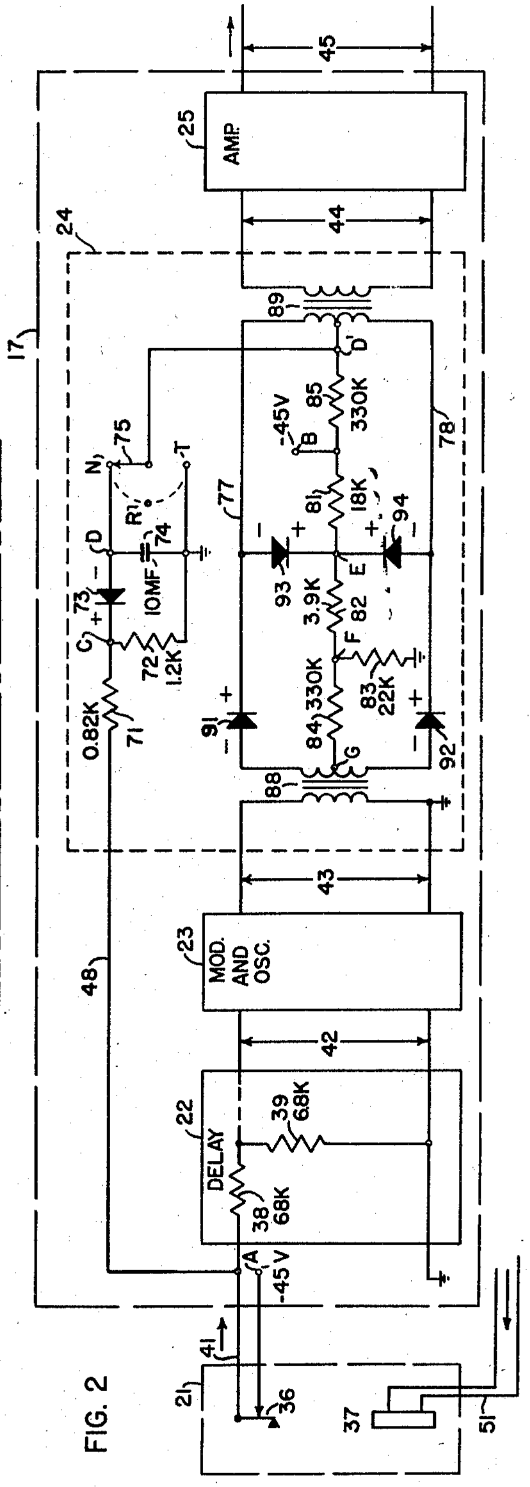

The foregoing and other objects and features of this invention and the manner of attaining them will become more apparent and the invention itself will be best understood, by reference to the following description of an embodiment of the invention taken in conjunction with the accompanying drawings comprising Figs. 1 and 2, wherein:

Fig. 1 shows telephone-telegraph terminal apparatus connecting a telephone station and a teletypewriter to a voice-frequency line; and Fig. 2 shows the transmitting section of the telegraph-terminal coupler, with the suppression circuit shown in circuit detail.

*Fig. 1.—General arrangement*

The telephone-telegraph terminal apparatus shown in Fig. 1 illustrates one arrangement in which the invention may be used.

A telephone line TP and a telegraph line TG are coupled to a voice-frequency line V. F. A band of frequencies, such as from 1175 to 1375 cycles, is blocked by band-stop filter 13 between line TP and line V. F., and is passed by band-pass filter 33 between line TG and line V. F., other frequencies in the voice range being passed by filter 13 and blocked by filter 33. Similar filters are used at the other terminal of line V. F. A signal converter 12 is used to convert between twenty-cycle ringing current on line TP and a signalling frequency such as 1600 cycles on line V. F.; and signal converter 32 is used to convert between twenty-cycle ringing current on line TG and a frequency such as 1225 cycles on line V. F. A telephone station S is connected to line TP, and a D. C. teletypewriter 21 is coupled by telegraph-terminal coupler 15 to line TG.

In coupler 15, ringing equipment 19 connected to line TG includes a twenty-cycle generator and a buzzer. Line TG is coupled by condenser 65 and path 45 to a transmitting section 17, and by condenser 66 and path 55 to a receiving section 18.

In the teletypewriter 21, the send contacts 36 are closed for mark signals and open for space signals. Receiving select magnet 37 has current flowing during mark signals and no current flow during space signals. When not operating, both the send contacts 36 and the select magnet 37 are in mark condition with current flowing. The send contacts 36 are connected by line 41 to coupler 15. The signals are converted by transmitting section 17 to A. C. signals at a mark frequency of 1325 cycles and a space frequency of 1225 cycles, and transmitted over path 45 to line TG. Signals received at 1325 and 1225 cycles over path 55 from line TG, and also from path 45 for home copy, are converted by receiving section 18 to D. C. signals on path 51 to operate select magnet 37. Both ringing and space signals from line V. F. are at 1225 cycles; but only the ringing signals, which are of long duration, are repeated at twenty cycles by signal converter 32.

The transmitting section 17 includes a delay circuit 22, a modulator and oscillator 23, a suppression circuit 24, and an output amplifier 25.

*Fig. 2—Transmitting section*

The transmitting section 17 of coupler 15 and the teletypewriter 21 are shown in Fig. 2. Current flow for the D. C. send path is from minus 45 volts at terminal A, through contacts 36, line 41, wire 48, and resistors 71 and 72, to ground. There is also a high-resistance path to ground from wire 41 through resistors 38 and 39 in delay circuit 22. The signal is delayed in circuit 22 by a network not shown, and connected by path 42 to circuit 23 to modulate the oscillator of circuit 23 to a frequency of 1325 cycles for mark signals and 1225 cycles for space signals. The oscillator operates continuously, and when teletypewriter 21 is not sending, the output to path 43 is a 1325-cycle mark signal.

To permit the station at the other terminal of line V. F., or other stations on line TG, to send, when station 21 is not sending the output to path 45 must be blocked. This is accomplished by suppression circuit 24 between the oscillator 23 and output amplifier 25. When sending starts with a space signal at line 41, a mark signal must be transmitted over output path 45 to the line TG before the first space signal. Therefore all signals are delayed 6.9 milliseconds in circuit 22. During part of this time the space signal on wire 48 causes operation of the suppression circuit 24 to the passing condition. When sending stops and a mark signal remains on wire 48 for three seconds, suppression circuit 24 operates to the blocking condition.

In suppression circuit 24, alternating-current signals from path 43 are coupled through transformer 88, over a balanced-to-ground link, through transformer 89, to path 44. In the balanced link, a balanced gate for the alternating-current signals comprises series diodes 91 and 92 and shunt diodes 93 and 94. All diodes are shown with the arrow pointing in the forward direction of electron flow from negative to positive. Bias to control the diodes is supplied from the simplex circuit of the link between point G at the center tap of the secondary of transformer 88 and point D′ at the center tap of the primary of transformer 89. A voltage divider from minus forty-five volts at terminal B, through resistors 81, 82, and 83, to ground, supplies substantially fixed potential at points E and F; point E being the junction of shunt diodes 93 and 94 and of resistors 81 and 82; and point F, the junction of resistors 82 and 83, being connected through resistor 84 to point G. The operation of the gate is controlled by the potential at point D′.

The control circuit includes a timing condenser 74 and a control diode 73. Point C, the junction of resistors 71 and 72, is connected to the positive terminal of the control diode 73. Point D, the junction of condenser 74 and diode 73, is connected through switch 75 in position N to point D′. The potential at point E, the positive terminals of shunt diodes 93 and 94, is about minus twenty-six and one-half volts; and the potential at point F, connected through resistor 84, point G, and the winding of transformer 88 to the negative terminals of series diodes 91 and 92, is about minus twenty-two and one-half volts. During mark signals, the potential at point C is about minus twenty-seven volts. During space signals point C is grounded through resistor 72.

There are high-resistance paths from points of negative potential to point D′ (1) from terminal B through resistor 85; (2) from point F, through resistor 84, dividing through the winding of transformer 88, the diodes 91 and 92, and the winding of transformer 89; and also (3) from point E inversely through diodes 93 and 94 and the winding of transformer 89. Timing condenser 74 may charge through these high-resistance paths to a potential not exceeding that of point C. If point C is at a lower negative potential than point D, condenser 74 discharges through the low forward resistance of diode 73 and resistor 72.

During sending operation of teletypewriter 21, condenser 74 will charge slightly through the high resistance paths during mark signals, and will discharge through the low resistance path during space signals, maintaining points D and D′ at substantially ground potential. Bias current flows forward through the series gate diodes 91 and 92 while the shunt diodes 93 and 94 are biased in the reverse direction. Therefore alternating current signals through transformer 88 are effectively coupled through diodes 91 and 92 to transformer 89, while shunt loss is prevented through diodes 93 and 94. This is the gate open condition.

When sending stops, point C remains at the minus twenty-seven volt mark potential, condenser 74 slowly charges through the high-resistance paths until points D and D′ reach the potential of point G, and then continues to charge through resistor 85 until points D and D′ reach the potential of point E. Current then flows forward through diodes 93 and 94, while diodes 91 and 92 are biased in the reversed direction. The flow of alternating-current signals between transformers 88 and 89 is effectively blocked by high impedance of diodes 91 and 92 and low shunt impedance of diodes 93 and 94. This is the gate closed condition.

When sending starts at teletypewriter 21 and contacts 36 open for the first space signal, the potential at point C drops, condenser 74 rapidly discharges, the gate is biased to open condition, and the alternating-current signals are passed through the link and transformer 89 to path 44. The signals reaching path 44 are amplified by output amplifier 25 and transmitted over path 45 to line TG.

It is essential that the gate operate rapidly in the blocking-to-transmission transition because the operating time is deducted from the signal delay provided by the delay circuit 22. When condenser 74 rapidly discharges there is a transient pulse in the gating circuit. A balanced configuration is used in the gating circuit to prevent this pulse from appearing in the output and saturating the amplifier, and thus nullifying the delay. When the potential at point D′ suddenly drops, the pulse is balanced through the primary of transformer 89 and therefore does not appear in the secondary.

Since condenser 74 must discharge rapidly, it cannot be made too large. Also the resistance which determines the D. C. sending current on line 41 is divided into resistors 71 and 72, to provide a low resistance path from point C to ground.

Switch 75 is provided for manual control of the gate. In position R of the switch, point D′ will be at a high negative potential, and the gate is closed to block transmission. In position T, point D′ is at ground potential and the gate is open to permit continuous transmission.

While I have described above the principles of my invention in connection with specific apparatus, it is to be clearly understood that this description is made only by way of example and not as a limitation to the scope of my invention.

I claim:

1. In combination, a source of alternating-current signals, an output circuit path, a two-wire balanced-to-ground link for coupling the source of alternating-current signals to the output circuit path, balanced diode gate means in said link, a simplex circuit in the link for controlling the gate means, a control diode, a signal source of variable potential direct current coupled to a first electrode of the control diode comprising first signals of one polarity and potential and second signals of a substantially lower potential, a storage condenser coupled to a second electrode of the control diode and to the link, the control diode being conducting when the first electrode is at a lower potential of said one polarity than the second electrode, a path of relatively high resistance from the second electrode to a source of fixed potential direct-current of said one polarity in the simplex circuit for charging the condenser while said first signals appear at the first electrode, a path of lower resistance through the control diode for discharging the condenser while said second signals appear at the first electrode, means responsive to the condenser charging to a given potential of said one polarity for biasing the diode gate to block the alternating-current signals, and means responsive to the discharge of the condenser to a substantially lower potential for biasing the diode gate to pass the alternating-current signals.

2. In a combination according to claim 1, modulating means by which signals from the said signal source of variable potential direct-current modulate the signals from the said source of alternating-current signals, delay means in the signal path between the signal source of variable potential direct current and the said diode gate means for producing a time delay of the said alternating-current signals with respect to the signals at the signal source of variable potential direct current, the said means responsive to the discharge of the condenser being operative upon the receipt of a said second signal at the said first electrode of the control diode while the gate is in blocking condition to bias the gate to the passing condition so that alternating-current signals modulated by the said first signal flow through the said output circuit path before alternating-current signals modulated by the said second signal.

3. A combination according to claim 1, wherein the said diode gate means comprises a pair of series diodes and a pair of shunt diodes.

4. In a combination according to claim 1, switch means having a normal position, a transmit position, and a receive position, means responsive to operation of the switch means to the normal position for controlling the said diode gate means according to the potential of the said storage condenser, means responsive to operation of the switch means to the transmit position for biasing the diode gate means to pass the said alternating current signals, and means responsive to operation of the switch means to the receive position for biasing the diode gate means to block the alternating-current signals.

References Cited in the file of this patent

UNITED STATES PATENTS

| | | |
|---|---|---|
| 2,144,995 | Pulvari-Pulvermacher | Jan. 24, 1939 |
| 2,466,959 | Moore | Apr. 12, 1949 |